United States Patent
Sanchez et al.

(10) Patent No.: US 10,392,764 B1
(45) Date of Patent: Aug. 27, 2019

(54) REVETMENT MAT

(71) Applicant: PREMIER CONCRETE PRODUCTS, INC., Baton Rouge, LA (US)

(72) Inventors: Blaine S. Sanchez, Baton Rouge, LA (US); Cary S. Goss, Baton Rouge, LA (US)

(73) Assignee: PREMIER CONCRETE PRODUCTS, INC., Baton Rouge, LA (US)

( * ) Notice: Subject to any disclaimer, the term of this patent is extended or adjusted under 35 U.S.C. 154(b) by 0 days.

(21) Appl. No.: 15/819,664

(22) Filed: Nov. 21, 2017

(51) Int. Cl.
*E02B 3/12* (2006.01)
*E02B 3/14* (2006.01)

(52) U.S. Cl.
CPC ............... *E02B 3/123* (2013.01); *E02B 3/14* (2013.01)

(58) Field of Classification Search
CPC . E02B 3/12; E02B 3/122; E02B 3/123; E02B 3/14
USPC ....................................................... 405/16, 20
See application file for complete search history.

(56) References Cited

U.S. PATENT DOCUMENTS

| | | | | |
|---|---|---|---|---|
| 554,354 A | * | 2/1896 | Villa ........................ | E02B 3/123 405/20 |
| 1,071,091 A | * | 8/1913 | Rogers .................... | E02B 3/123 405/20 |
| 1,144,143 A | * | 6/1915 | McGillivray ........... | E02B 3/123 405/20 |
| 1,983,772 A | * | 12/1934 | Pierson .................... | E02B 3/123 405/20 |
| 2,454,292 A | * | 11/1948 | Pickett .................... | E02B 3/123 405/20 |
| 2,876,628 A | * | 3/1959 | Dixon, Jr. ............... | E02B 3/123 404/36 |
| 3,922,865 A | * | 12/1975 | Nijdam .................... | B63B 27/02 405/17 |
| 4,370,075 A | * | 1/1983 | Scales ....................... | E02B 3/14 404/41 |
| 4,375,928 A | * | 3/1983 | Crow ....................... | E02B 3/123 405/17 |
| 4,564,311 A | * | 1/1986 | Scales ....................... | E02B 3/14 404/35 |
| 4,664,552 A | * | 5/1987 | Schaaf .................... | E02B 3/123 24/34 |
| 5,108,222 A | * | 4/1992 | Jansson .................... | E02B 3/123 405/15 |
| 5,622,449 A | * | 4/1997 | Essay, Jr. ................. | E02B 3/04 405/19 |

(Continued)

*Primary Examiner* — Frederick L Lagman
(74) *Attorney, Agent, or Firm* — Roy Kiesel Ford Doody & North, APLC (57) ABSTRACT

A revetment mat meeting ASTM D6460 performance standards, as well as provides transportation and installation advantages that is constructed from a combination of small square blocks and larger rectangular blocks linked together by a series of cables to form a generally rectangular shaped revetment mat having lifting loops which linked blocks form non-linear water flow passageways whose shapes are maintained utilizing rigid straps and flexible, hollow, tubular spacers that also permit the revetment mat to be rolled up for transportation from the fabrication site to the construction site where the revetment mats will be installed in a revetment system.

23 Claims, 9 Drawing Sheets

(56) References Cited

U.S. PATENT DOCUMENTS

| | | | | |
|---|---|---|---|---|
| 5,632,571 A | * | 5/1997 | Mattox | E02B 3/14 |
| | | | | 405/19 |
| 5,779,391 A | * | 7/1998 | Knight | E02B 3/14 |
| | | | | 404/41 |
| 5,820,299 A | * | 10/1998 | Anderson | F16L 1/24 |
| | | | | 405/172 |
| 5,846,023 A | * | 12/1998 | Angel | F16L 1/123 |
| | | | | 405/17 |
| 5,911,539 A | * | 6/1999 | Egan | E02B 3/122 |
| | | | | 405/16 |
| 5,988,942 A | * | 11/1999 | Atkinson | E02B 3/14 |
| | | | | 404/40 |
| 8,678,705 B1 | * | 3/2014 | Smith | E02B 3/14 |
| | | | | 405/16 |

* cited by examiner

REVETMENT MAT

BACKGROUND OF THE INVENTION

Field of the Invention

This invention relates in general to erosion control products. More particularly, the invention relates to a rolled erosion control product (RECD) revetment mat meeting ASTM D6460-12 performance standards in protecting earthen channels from storm water-induced erosion.

Prior Art

It has been known running water over earthen surfaces can result in the erosion of the earth from the surface. In general, the amount of erosion increases with the increase of the velocity of the water moving across the earthen surface. In many instances such soil erosion is undesirable and means must be used to impede or stop the soil erosion.

One known solution to eliminate or control the erosion is the use of concrete blocks to cover the earthen surface. It is also known that in cases of extreme slopes or areas of wave action to attach erosion control mats to the concrete blocks to better control erosion. However, if the velocity of the water is sufficiently high the soil under the concrete blocks can still be eroded. In addition, the laying of individual blocks is not only time consuming, but expensive. This has led to the development of revetment mats constructed from multiple concrete blocks cabled to one another. To ensure that the revetment mats can achieve their desired function, the industry has adopted the standards set forth in ASTM D6460-12. These standards address whether a revetment mat sufficiently neutralizes and absorbs the hydraulic force of storm water thereby reducing soil particle loosening though "scour" mechanisms; slows runoff and encourage sedimentation, thereby reducing soil particle transport downstream; absorbs shear forces of overland flow; trap soil particles beneath the mat; and promote the establishment of vegetation in the surface area covered by the revetment mats. In addition to the revetment mats meeting these ASTM standards, it is important to the industry that the individual blocks, as well as the cabling system used to join the blocks in formation of the revetment mat, can be manufactured economically. The manufacturing of the concrete blocks and the assembling of the revetment mats typically occur at a manufacturing site that is rarely close to the construction site where the revetment mats are to be installed in the revetment structure. For this reason it is also important to the industry that the resultant revetment mats can be easily, and inexpensively, transported from the manufacturing site to the construction site. Still further, once the revetment mats arrive at the construction site it is important that they can easily and quickly be unloaded and properly positioned at the construction site wherein the revetment structure is being built.

To address the industry ASTM standards, as well as the transportation issues and the installation issues, many advances have been made to construction of the revetment mats. Despite these improvements to the concrete block designs and the cabling systems used to join the blocks, there remains in the industry for a revetment mat that not only meets but can exceeds the applicable ASTM standards, but which can also be economically, quickly and safely installed into the revetment structure at the construction site.

OBJECTS AND SUMMARY OF THE INVENTION

Therefore, one object of this invention is to provide a revetment mat constructed of multiple blocks cabled together in an improved manner to provide a first set of lifting loops to facilitate loading and unloading from a transport vehicle and a second set of lifting loops that can facilitate the positioning of the revetment mat in the revetment structure.

Another object of this invention is to provide a revetment mat constructed of multiple sized blocks linked to one another by cabling and positioned with respect to one another to reduce the velocity of the water flowing through the revetment mat.

Still another object of this invention is to provide a rectangular revetment mat constructed of multiple sized blocks linked to one another by cabling and provided with flexible spacing elements and rigid straps to maintain the desired distance between the blocks to control the water velocity and flow pathway and to permit the sedimentation of any eroded soil in the spaces of the separated blocks to enhance the growth of vegetation in these spaces.

A still further object of this invention is to provide a revetment mat wherein the spacing elements are hollow tubular members constructed to permit the cabling to pass through the spacing elements to allow e revetment mat to better conform to the curvature of the soil surface on which the revetment mat is to be laid.

Another object of this invention is to provide a revetment mat constructed of multiple blocks cabled to one another wherein the top surface of the blocks includes sloped perimeter areas of the blocks provided with dimples or other water-retarding members to reduce the water flow velocity through the revetment mat.

Still another object of the invention is to construct a revetment mat having sufficient flexibility to be rolled up for transportation and to better facilitate positioning the revetment mat into the revetment structure.

These and other objects of this invention shall become apparent from the ensuing descriptions of the invention.

Accordingly, a revetment mat is provided comprising multiple-sized blocks linked to one another with cabling to form non-linear water flow passageways within the revetment mat to retard water flow through the revetment mat. In a preferred embodiment the blocks are arranged to form a rectangular shaped revetment mat having one side to receive the water flow into the non-linear passageways and having an opposite side which the water flowing through the revetment mat is discharged from the non-linear passageways. In most installations the water receiving side will be positioned facing into the water stream.

In another preferred embodiment these two opposing sides of the revetment mat are constructed to permit the cabling system to form lifting loops on both of these opposing sides to facilitate proper positioning of the revetment mat into the revetment structure.

In still another preferred embodiment the adjacent blocks used in the revetment mat to form the water receiving side are fixed in position to one another by use of rigid straps that are fixed to the adjacent cables running through the adjacent block. It is also preferred that the adjacent blocks used in the ent rust to form the water discharging side are similarly provided with rigid straps. These rigid straps set the width of the water receiving side and the water discharging side of the revetment mat, as well as determine the width of the water passageways. To set the length of the water passageways in the revetment mat as well as provide sufficient flexibility to enable the revetment mat to rolled up for transportation and better conform to the contours of the soil surface on which the revetment mat will be laid, it is preferred that the cabling between the blocks pass through hollow flexible tubing of a predetermined length. In this embodiment it is preferred that stop means be positioned on the cabling forming the lifting loops not only to attach the opposite ends of each cable together, but also to set the length of the cable running through the blocks and thus the approximate length of the revetment mat, as well as to maintain the size of the lifting loops.

In a more preferred embodiment the block configuration of the outer rows of blocks forming the water receiving side and the water discharging side will each be constructed using 1×1 unit wide blocks. In this embodiment the other two opposing sides will each be constructed using alternating 1×1 unit and 1×1½ unit wide blocks. This arrangement results in the formation of the non-linear water passageways in the revetment mat.

In another preferred embodiment the blocks are constructed wherein the top surface of the block is provided with a sloped perimeter extending from the flat top surface area to the top edge of the straight walls forming the side of the blocks. In this embodiment the sloped perimeter area is constructed having dimples or other water flow retarding members to reduce the water flow velocity over the top surface of the revetment mat. In an alternate preferred embodiment the dimples can also be provided on the straight walls forming the side of the blocks or on the flat top surface area.

In another preferred embodiment a known geogrid can be secured to the concrete block mats by hog rings or other similar known attaching means. In this embodiment the revetment mat will be positioned on top of the geogrid. This embodiment better fixes and holds the concrete blocks in their desired position relative to one another thus assisting in the rolling of the revetment mats for transportation, as well as in the placement of the revetment mats in proper position in the revetment system. In other situations where the revetment system will be positioned on steep slopes or subject to wave action it is also preferred to attach a known erosion-control blanket to the revetment mat. The erosion-control blanket like the geogrid can be attached to the revetment mat by the use of hog rings and other similar known attaching devices. In this embodiment the revetment mat will be rest on the erosion-control blanket. If desired both an erosion-control blanket and a geogrid can be used. In this embodiment the geogrid is positioned between the erosion-control blanket and the concrete revetment block.

The foregoing has outlined rather broadly the features and technical advantages of the present invention in order that the detailed description of the invention that follows may be understood. Additional features and advantages of the invention will be described hereinafter which form the subject of the claims of the invention. It should be appreciated by those skilled in the art that the conception and specific embodiments disclosed may be readily utilized as a basis for modifying or designing other embodiments of the mats or blocks for carrying out the same purposes of the present invention. It should also be realized by those skilled in the art that such equivalent embodiments do not depart from the spirit and scope of the invention as set forth in the appended claims. The novel features which are believed to be characteristic of the invention, both as to its organization and method of use, together with further objects and advantages will be better understood from the following descriptions of the invention.

BRIEF DESCRIPTION OF THE FIGURES ILLUSTRATING THE PREFERRED EMBODIMENTS OF THE INVENTION

PREFERRED EMBODIMENTS OF THE INVENTION

Figure 1:
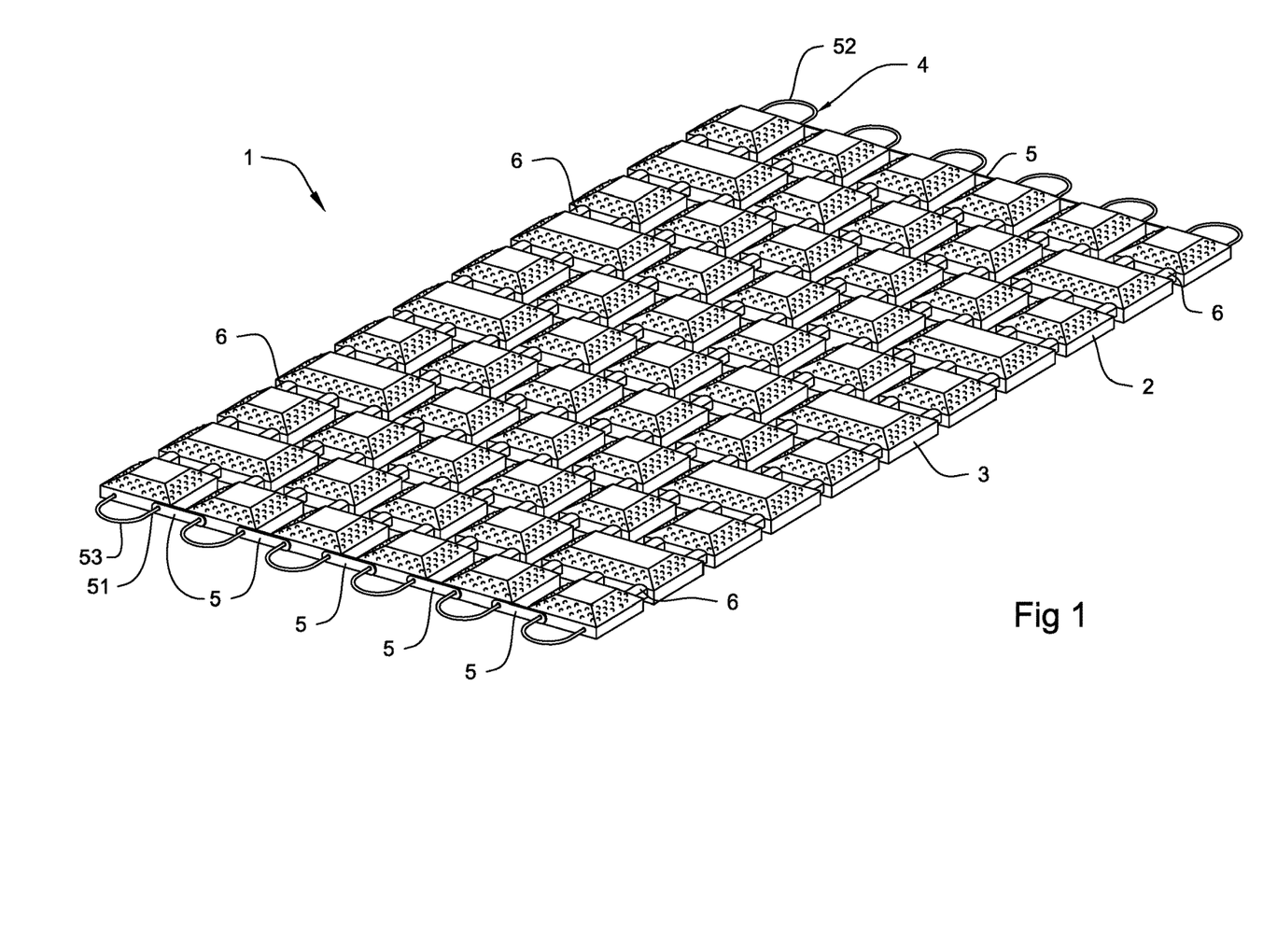
FIG. 1 is three-quarter perspective view of the revetment mat of the invention illustrating a generally rectangular shaped mat constructed utilizing multiple sized blocks to form non-linear multiple waterways for water to flow through the revetment gnat.
Figure 1A:
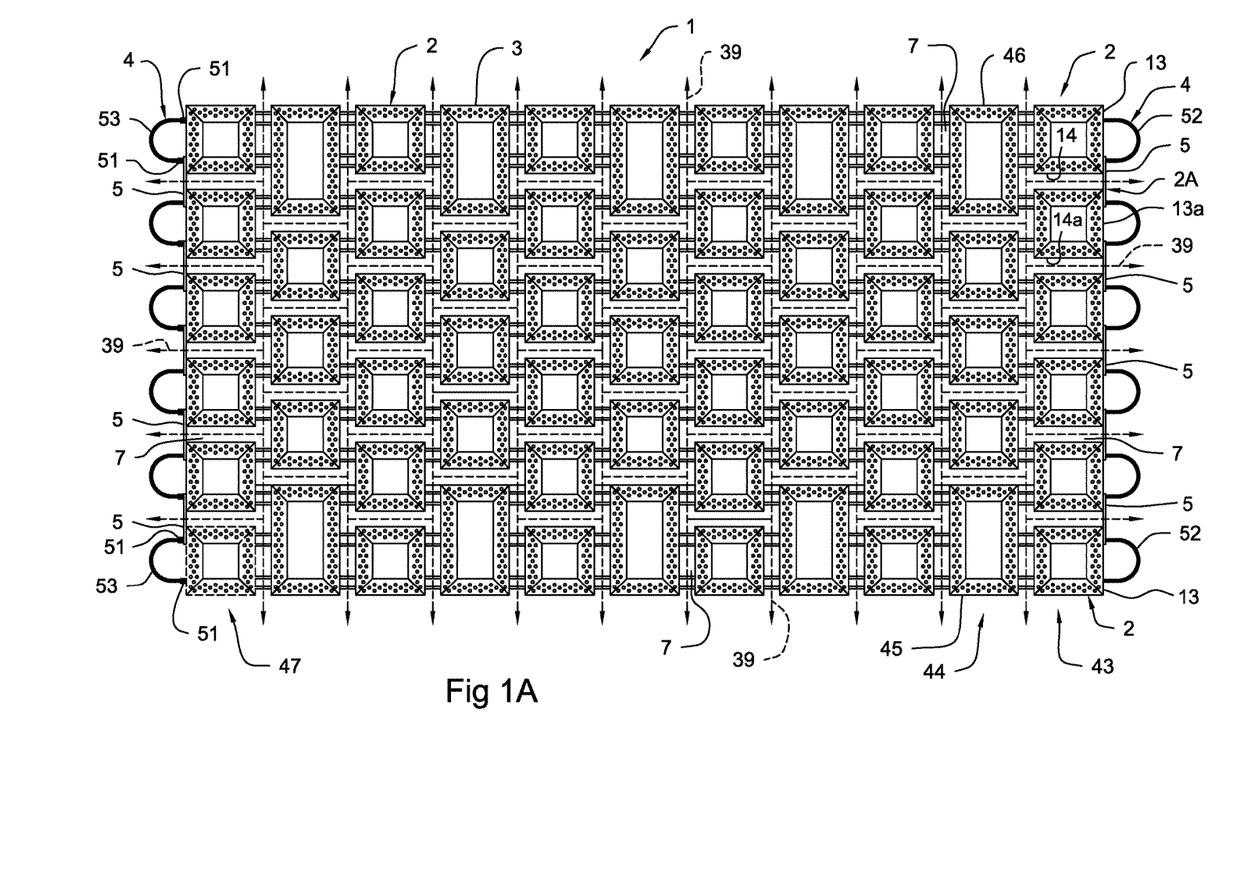
FIG. 1A is a top view of FIG. 1 illustrating a preferred configuration of the multi-sized blocks cabled together in the direction of the water flow and separated a predetermined distance by flexible tubing through which the cables forming the cabling system can pass, and further held in position relative to one another by rigid straps extending across the entrance and exit position of the waterways formed by adjacent upper and lower perimeter blocks.
Figure 1B:
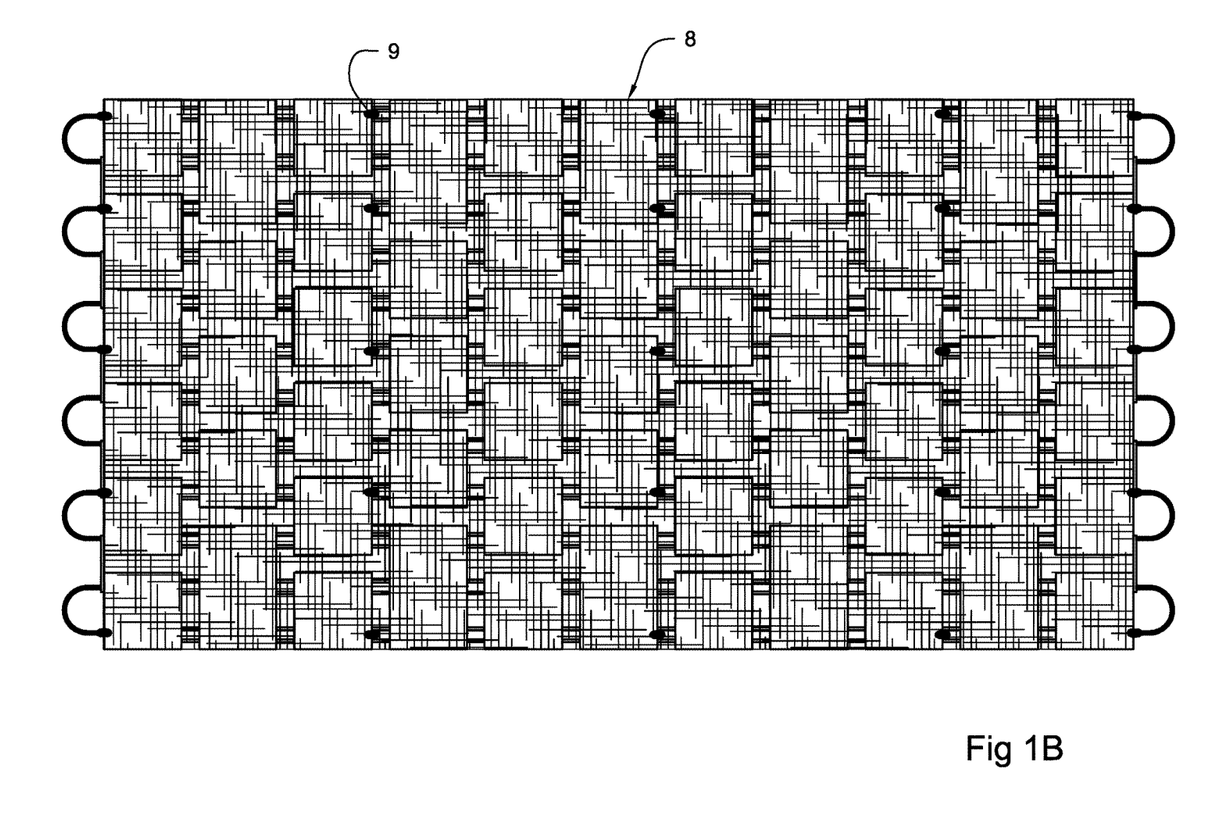
FIG. 1B is an alternate bottom view of FIG. 1 illustrating a geogrid affixed to the revetment mat by use of hog rings.

Turning now to FIGS. 1 and 1A a preferred embodiment of the revetment mat 1 is illustrated. The revetment mat 1 is formed from a novel array of small and larger concrete blocks 2 and 3, respectively, which are linked together by a series of cables 4 and substantially fixed in position by the use of a series of rigid straps 5 and a series of flexible, hollow tubular spacers 6 to form the rectangular-shaped revetment mat 1 so constructed having non-linear water flow paths 7 through the revetment mat 1.

Figure 1C:
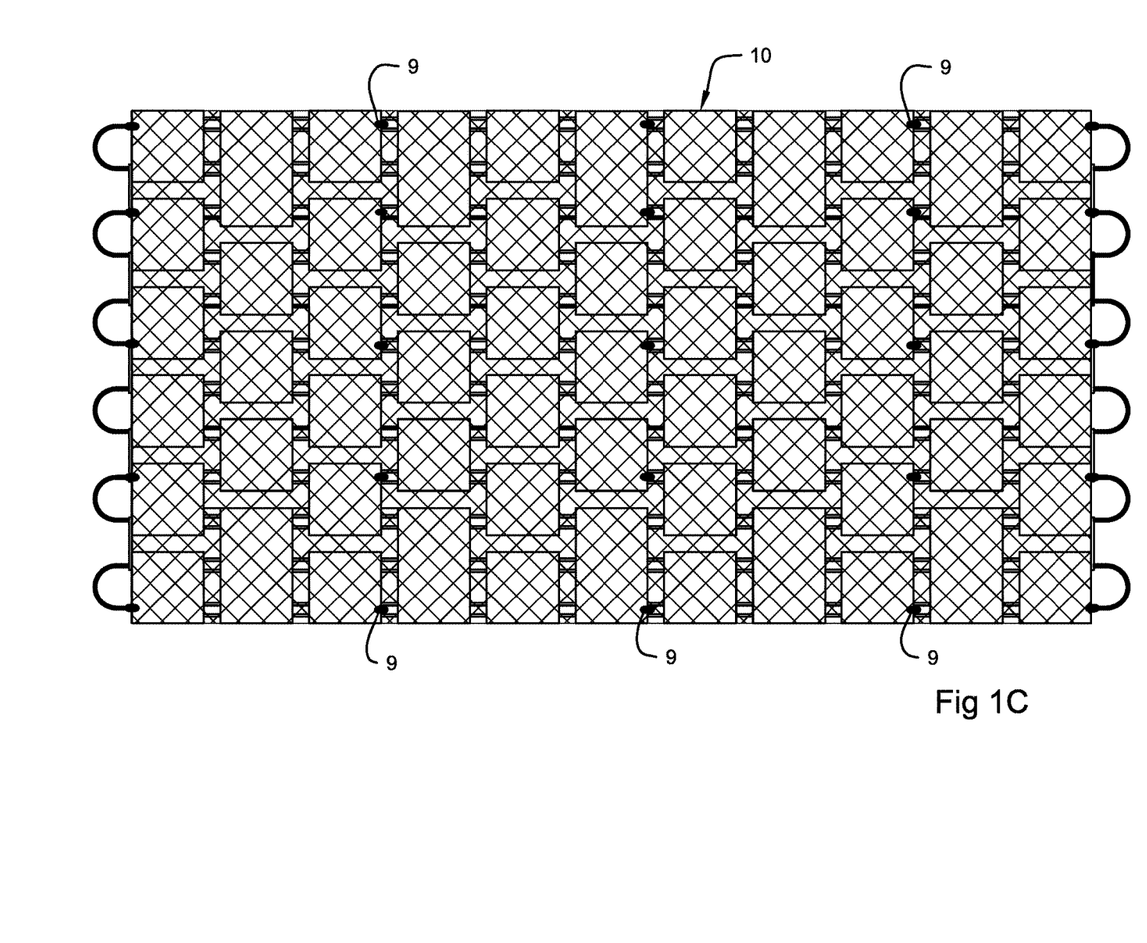
FIG. 1C is another alternate bottom view of FIG. 1 illustrating an erosion-control blanket affixed to the revetment mat by use of hog rings.
Figure 1D:
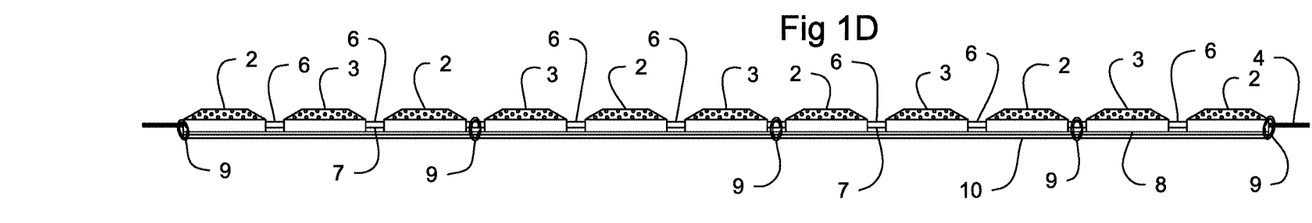
FIG. 1D is a side view of a revetment mat having both a geogrid and an erosion-control blanket affixed to the revetment mat.
Figure 2:
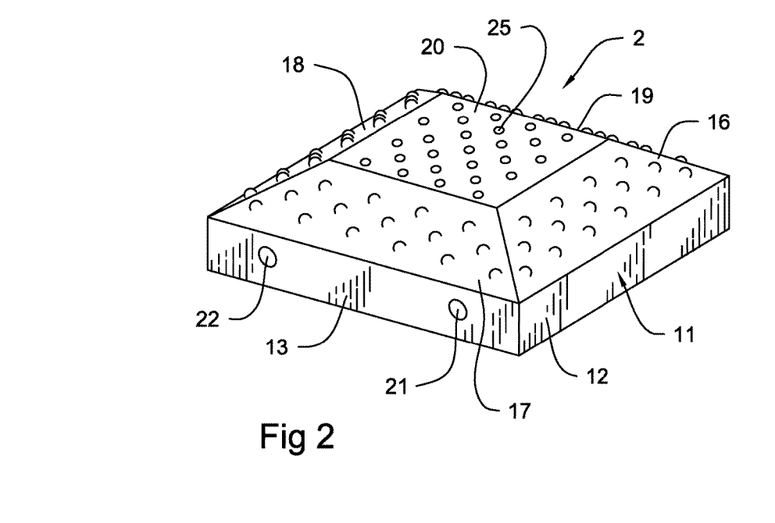
FIG. 2 is a three-quarter perspective view of one of the smaller substantially square blocks.
Figure 2A:
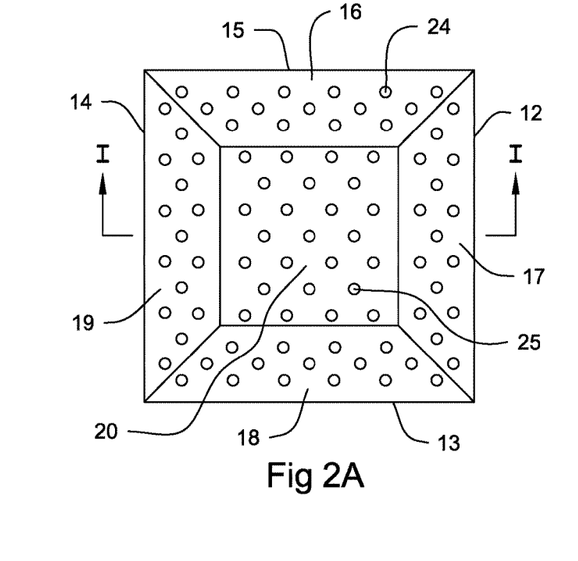
FIG. 2A is a top view of FIG. 2 illustrating the dimples or water flow retarding members positioned on the sloped section of the top surfaces of the block.
Figure 2B:
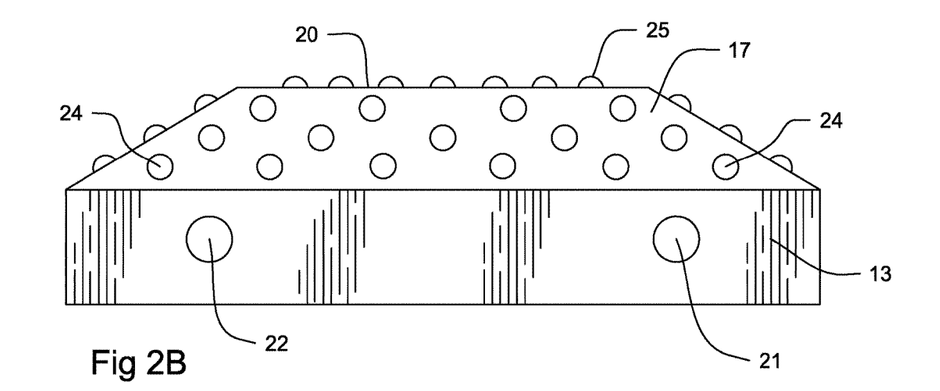
FIG. 2B is a side view of FIG. 2 illustrating the position of the cable passageway openings in the smaller block.
Figure 2C:
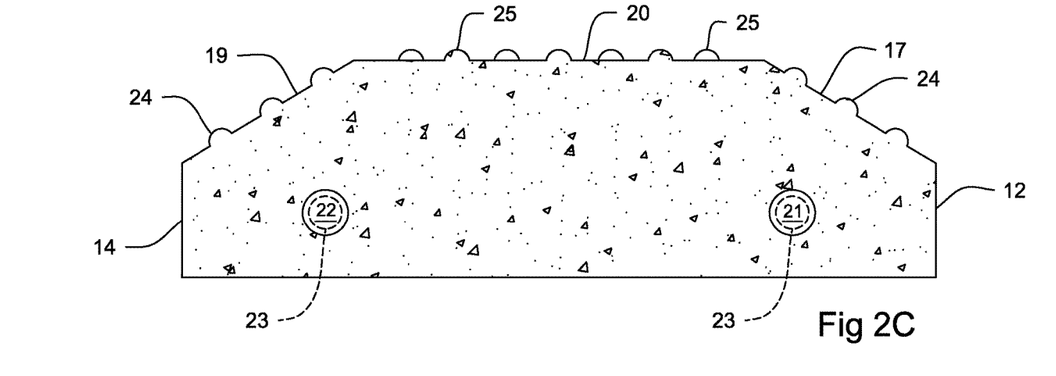
FIG. 2C is a cross-sectional view taken along lines I-I of FIG. 2.
Figure 3:
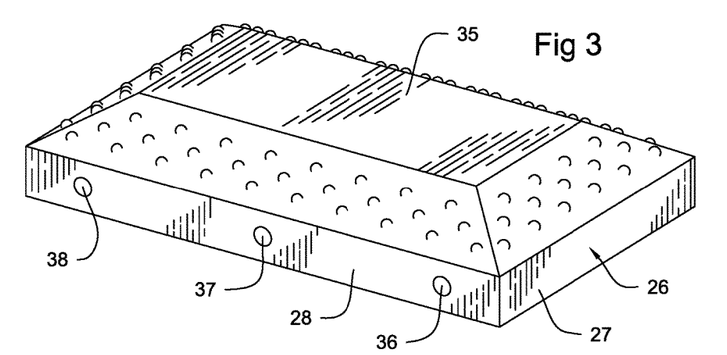
FIG. 3 is a three-quarter perspective view of one of the larger, substantially rectangular blocks.
Figure 3A:
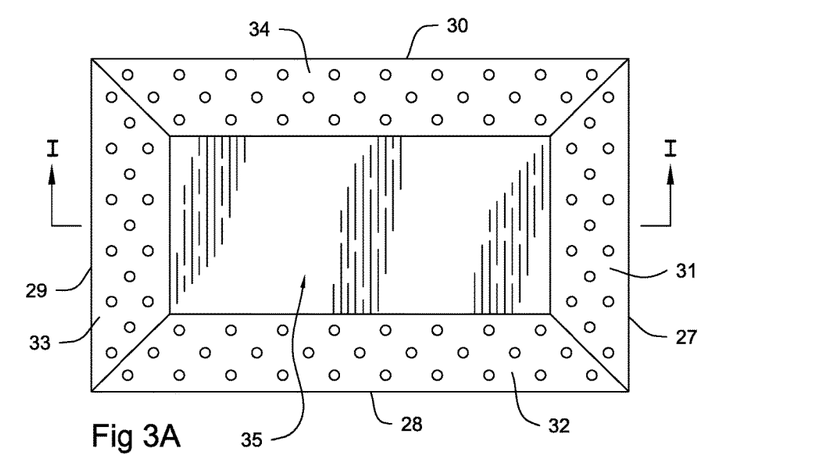
FIG. 3A is a top view of FIG. 3 illustrating the dimples or water flow retarding members positioned on the sloped section of the top surface of the larger block.
Figure 3B:
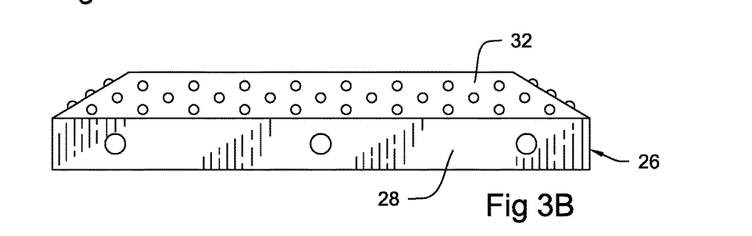
FIG. 3B is a side view of FIG. 3 illustrating the position of the cable passageway openings in the larger block.
Figure 3C:
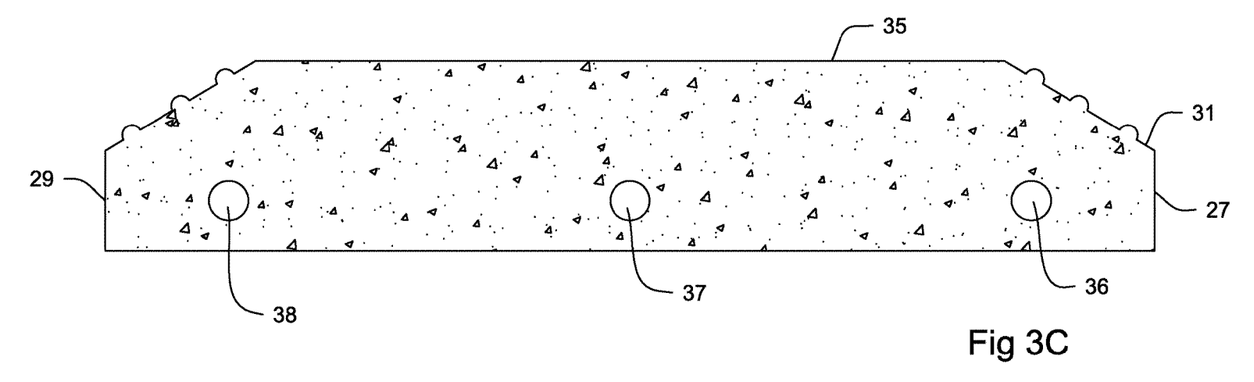
FIG. 3C is a cross-sectional view taken along lines I-I of FIG. 3.

In an alternate embodiment as illustrated in FIGS. 1C-1D a known geogrid 8 can be secured to the concrete blocks 2, 3 by hog rings 9 or other similar known attaching means. In this embodiment the revetment mat 1 will be positioned on top of the geogrid 8. This embodiment better fixes and holds the concrete blocks 2, 3 in their desired position relative to one another thus assisting in the rolling of the revetment mats 1 for transportation, as well as in the placement of the revetment mats 1 in proper position in the revetment system. In other situations where the revetment system will be positioned on steep slopes or subject to wave action it is also preferred to attach a known erosion-control blanket 10 to the revetment gnat 1. The erosion-control blanket 10 like the geogrid 8 can be attached to the revetment mat 1 by the use of hog rings 9 and other similar known attaching devices. In this embodiment the revetment mat 1 will be rest on the erosion-control blanket 10. If desired both an erosion-control blanket 10 and a geogrid 8 can be used. In this embodiment the geogrid 8 is positioned between the erosion-control blanket 10 and the concrete revetment block 1.

As best seen in FIGS. 2 and 2A-2C, a preferred embodiment of the small concrete block 2 is molded having a generally square base 11 with four side walls 12-15 extending perpendicularly upward from base 11. The top of block 2 is formed having four sloped perimeter panel sections 16-19 and a flat top surface 20. Two parallel generally straight cable passageways 21 and 22 extend through opposing side walls 12 and 14. In a preferred embodiment cable passageway 21 is positioned parallel to and about ¼ of the width of block 2 from side wall 15. In similar manner cable passageway 22 is position parallel to and about of the width of block 2 from side wall 13. This preferred alignment of cable passageways 21 and 22 positions the passageways about ½ of the width of block 2 from each other. This permits easy alignment with the cable passageways in the larger block 3 as described herein below. Passageways 21 and 22 are sufficiently large to permit cable 23 to be extended through the passageways 21 and 22. In addition this passageway alignment facilitates easy lifting of the revetment mat 1 as described herein below. In another preferred embodiment on at least one, but more preferably on all, of sloped panels 1649 are provided with raised surface sections or dimples 24. In still another preferred embodiment flat top surface 20 will also be provided with similar raised surface sections or dimples 25. These dimples 24 and/or 25 will further impede the water flow through revetment mat 1 and consequently reduce the water flow velocity and rate of soil erosion.

As seen in FIGS. 3 and 3A-3C, a preferred embodiment of the larger concrete block 3 is molded having a generally rectangular shaped base 26 with four side walls 27-30 extending perpendicularly upward from base 26. The top of block 3 is formed having four sloped perimeter panel sections 31-34 and a flat top surface 35. In a preferred embodiment the height of block 2 and block 3 are about the same to facilitate transporting revetment mat 1 from the fabrication site to the installation site. Three parallel cable passageways 36-37 extend through opposing side walls 27 and 29. In a preferred embodiment cable passageway 36 is positioned parallel to and about ¼ of the width of block 3 from side wall 30. This permits passageways 21 and 36 to be aligned with one another when side wall 15 of block 2 and side wall 30 of block 3 are closely aligned with one another. In similar manner cable passageway 37 is position a distance from side wall 30 to align with passageway 22 when side wall 15 of block 2 and side wall 30 of block 3 are closely aligned with one another. Cable passageway 38 will be positioned parallel to side wall 28 of block 3. The distance cable passageway 38 is from side wall 28 depends on the width of the water flow channel 39 between side wall 13 of block 2 and side wall 15a of block 2a positioned adjacent to one another in revetment mat 1. The position of cable passageway 38 is preferable determined whereby cable passageway 38 is closely aligned with cable passageway 21a of block 2a.

As illustrated in FIGS. 1 and 1A, adjacent blocks 2 have their side walls 13 in alignment with one another, and their side walls 14 being parallel to one another. It is further preferred that the large block walls 27 and 29 each be about the same width as small block walls 13. To maintain the desired distance between the adjacent side walls of the small blocks 2 and the larger blocks 3 used to form revetment mat 1, rigid straps 5 and flexible hollow tubular spacers 6 are utilized.

It is preferred that that the first row 43 of blocks to receive the water flow be constructed of small blocks 2. The second row 44 of blocks would preferably be constructed having its end blocks 45 and 46 being large blocks 3 and the interior blocks in row 44 being small blocks 2. It is further preferred that the succeeding rows forming revetment mat 1 be constructed in the same block size pattern as rows 43 and 44. It is still further preferred embodiment that the last row 47 be constructed in the same block size pattern as row 43. As best illustrated in FIG. 1A, this pattern of blocks 2 and 3 to form a non-linear water flow passageway 7. In a preferred embodiment the water flow channels 7 have a width that is ⅛ to ¼ the width of small block 2. As the water enters the passageways 7 (illustrated by the dashed lines) between blocks 2 in the first row 43 it strikes the blocks in the second row 44 which impedes and reduces the velocity of the water flowing through passageways 7. The water is continuously impeded and its velocity reduced as it continues through passageways 7 formed by the subsequent rows until it finally exits the passageways 7 formed in the last row 47. As a result there is less erosion of the soil beneath the revetment mat 1 and an increase in soil sediment being deposited in the passageways to form a bed for vegetation growth.

Figure 4:
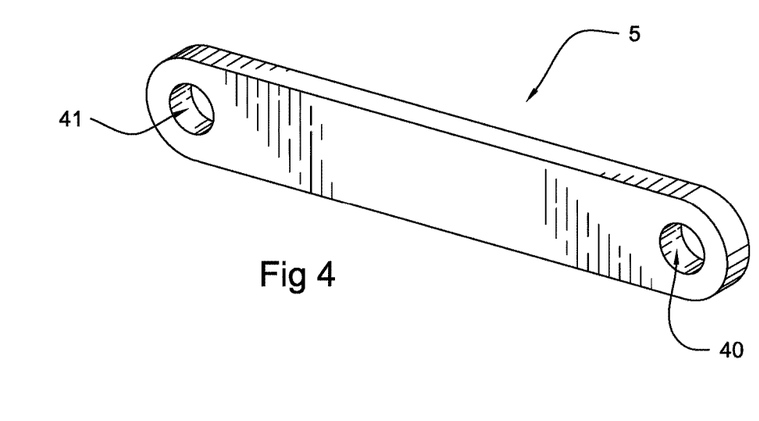
FIG. 4 is a perspective view of the rigid strap used to maintain the preferred separation between the blocks in the first and last row of blocks utilized in forming the revetment mat of this invention.

FIG. 4 illustrates a preferred embodiment of the rigid strap 5. Rigid strap 5 can be of many different shapes, but preferably is generally an elongated rectangular or oval shape. It can be constructed of any rigid material, although hard plastic or metal are preferable. Rigid strap 5 is provided with two spaced apart openings 40 and 41, each large enough to permit cable 4 to pass through openings 21 in block 2 and spacer opening 40, and then back through spacer opening 41 and into block opening 22, respectively. Preferably, openings 40 and 41 are spaced apart from one another whereby opening 40 is aligned with cable passageway 21 and opening 41 is aligned with cable passageway 22. The opposite ends of cable 4 are fixed to one another in a manner that restricts the movement of cable 4 into and out of passageways 21 and 22.

Figures 5, 6:
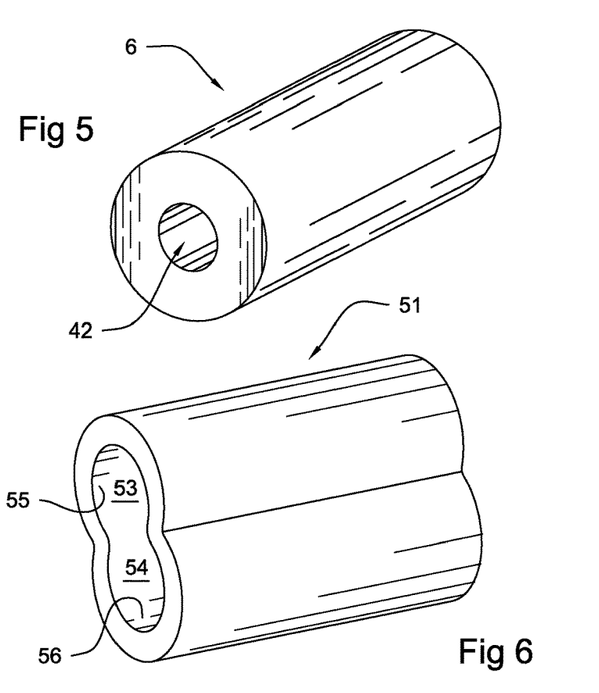
FIG. 5 is a perspective view of a preferred embodiment of the flexible, hollow tubular spacer used to maintain the preferred separation between the adjacent rows of blocks utilized in forming the revetment mat of this invention.
FIG. 6 is a perspective view of a preferred embodiment for attaching the opposite ends of a cable outside a small block forming part of the first row of blocks utilizing a conventional crimping device to form double-cable thick loop and to also act as a stop member to prevent the loop from moving into the cable passageway of the small block.

FIG. 5 illustrates a preferred embodiment of the flexible, hollow tubular spacer 6. The passageway 42 of each spacer 6 is sufficiently large to permit cable 4 to pass through passageway 42. Spacer 6 is sufficiently flexible to permit the block rows 43 forming revetment mat 1 to be at least partially rolled on top of one another to better facilitate transporting the revetment mats 1 from the fabrication site to the installation site. At the same time spacer 6 must be sufficiently rigid to maintain the desired spacing between adjacent rows 43 when the revetment mat 1 has been positioned in the revetment system.

In a preferred embodiment each of cables 4 will be of about the same length. The length must be sufficient to pass through all of the blocks 2 and 3 in a column 48 constructed of alternating small and large blocks 2 and 3, as well as through each of the spacers positioned between the adjacent blocks in column 48 and finally to permit the formation of lifting loops 49 and 50 at each end of a column 48.

FIG. 6 illustrates a preferred embodiment of affixing a cable 4 in position whereby it will remain relatively taunt and not move laterally through the cable passageways 21 and 22 in block 2 and/or cable passageways 36-38 in block 3. In this embodiment the blocks 2 and 3 are retained in a more fixed position when positioned in the revetment system, thus facilitating the formation of the revetment system. In one preferred embodiment this is obtained utilizing a conventional crimping device 51 to form double-cable thick loop 52. Crimping device 51 is constructed to having two joined passageways 53 and 54 sized to permit the opposing ends of cable 4 to be snuggly positioned in passageways 53 and 54. Crimping device 51 is constructed from soft metal or similar material permitting the passageways side walls 55 and 56, respectively, to be squeezed against cable ends thus securing them in crimping device 51. Crimping device 51 preferable is sufficiently large that if cannot pass into the block passageways 21, 22, 36, 37 and 38. In a preferred embodiment, to maintain the desired size of lifting loops 52 and 53 it is preferred a crimping device 51 is positioned at each entrance and exit to exterior block passageways 21 and 22.

Figure 7:
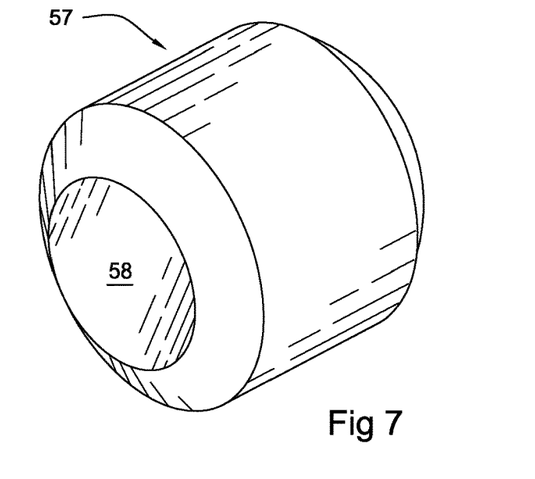
FIG. 7 is a perspective view of a preferred embodiment of forming a one-cable lifting loop outside a small block forming part of the last row of blocks a conventional crimping device a stop member to prevent the single-cable loop from moving into the cable passageway of the small block.

Alternatively, as illustrated in FIG. 7 a stop member 57 can be used to prevent crimping device 51 from passing into block passageways 21, 22, 36, 37 and/or 38. In this embodiment stop member 57 is cylindrical in shape having a diameter greater that the diameter of block passageways 21, 22, 36, 37 and 38. Stop member 57 has a central passageway 58 size to permit cable 4, but not crimping device 51, to pass through central passageway 58.

In fabricating the revetment mat 1 as illustrated in FIGS. 1 and 1A, the array of blocks 2 and 3 will be used to forming a mat leading edge 48 having an entrance 49 to the water-flow channels 50 to receive the water that flows through revetment mat 1 and a mat trailing edge 51 having an exit 52 to the water flow channels 50 to discharge the water that flows through revetment mat 1.

To construct revetment mat 1, blocks 2 and 3 are manufactured and then positioned relative to one another to form the desired shape with the cable passageways 21-22 and 36-38 being aligned with one another as illustrated. Cable 4 is then inserted into cable passageway 21 of the initial block of block column 44. When cable 4 extends through the initial passageway 21 of block column 44, it then extends through a flexible spacer 6 before entering passageway 21a of the adjacent block in column 44. This process is repeated until cable 4 extends through the last block in column 44 at which time it is bent to form loop 46 and then extended through passageway 22 of last block in column 41. Cable 4 is then extended through another flexible spacer 6 and this process is repeated until cable 4 exits the last passageway 22 in the column 44. The opposite ends 53-54 of cable 4 are doubled over each other to form double cabled loop 45. Both opposite ends 53, 54, respectively, of cable 4 are extended through rigid strap opening 40. Clamping devices 47 are affixed to the single cable loop 46 to fix its size. The blocks in column 44 are adjusted to position then against the flexible spacers 6 and the opposite ends of cable 4 are overlapped and fixed in position by clamping devices 47. This process is continued for each column 44 until revetment mat 1 is formed.

If revetment mat 1 is to be formed to include an erosion-control blanket 10, revetment mat 1 is laid on top of erosion-control blanket 10 and affixed to erosion-control blanket 10 by use of hog rings 9. If instead of erosion-control blanket 10, revetment mat 1 is to be formed to include a geogrid 8, revetment mat 1 is laid on top geogrid 8 and affixed to geogrid 8 by use of hog rings 9. In another embodiment if revetment mat 1 is to be formed to include both erosion-control blanket 10 and geogrid 8, the geogrid 8 is laid over the erosion-control blanket 10. The revetment mat 1 is then laid on top of geogrid 8 and affixed to both erosion-control blanket 10 and geogrid 8 by use of hog rings 9.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What we claim is:

1. A revetment mat comprising multiple-sized blocks linked to one another to form non-linear water passageways between the linked blocks; the blocks arranged to form a generally rectangular shaped revetment mat having a receiving side of the revetment mat to receive and direct a water flow having an initial water flow rate into one of the non-linear water passageways and having an opposite discharging side of the revetment mat positioned to discharge the water from the one of the non-linear water passageways at a reduced water flow rate wherein:
   a. at least one of the blocks is a smaller block and wherein at least another of the blocks is a larger block and
   b. the small block is about one unit wide by about one unit long and the larger block is about one unit wide by about one and one-half units long and wherein the blocks are each separated from each other by about one-eighth to about one-quarter units distance to form water passageways that are about one-eighth to about one-quarter units wide.

2. The revetment mat according to claim 1 wherein
   a. each of the smaller block is fabricated having two parallel cable passageways sized to permit the cables to pass through the small block cable passageways,
   b. each of the larger block is fabricated having three parallel cable passageways sized to permit the cables to pass through the large block cable passageways, and
   c. the two small block cable passageways are either aligned with two of the three large block cable passageways when the small blocks and large blocks are positioned to fabricate the revetment mat, or aligned with one of the three large block cable passageways and with one of the two small block cable passageways when the small blocks and large blocks are positioned to fabricate the revetment mat.

3. The revetment mat of claim 2 wherein
   a. the receiving side and the discharge side of the revetment mat each comprise a first row constructed of small blocks and a second row containing at least two large blocks, each of the large block positioned at one of the opposite ends of the second row.

4. The revetment mat of claim 2 wherein the rows of blocks forming the revetment mat alternate between a row comprising small blocks and an adjacent row comprising small blocks and large blocks wherein the large blocks of the adjacent row are positioned at opposite ends of the adjacent row.

5. The revetment mat of claim 2 comprising:
   a. an even number of aligned cable passageways in the revetment mat,
   b. a first cable extending through the first two rows of aligned cable passageways, and
   c. for each additional pair of rows of aligned cable passageways, an additional cable extend through one of the additional pairs of aligned cable passageways.

6. The revetment mat of claim 5 wherein
   a. each of the cables comprises a length sufficient to pass through two rows of aligned cable passageways and form lifting loops at each end of the aligned cable passageways, and
   b. the ends of each cable are affixed to one another to form a continuous length of the cable.

7. The revetment mat according to claim 6 wherein one or more stop members is affixed to the cable at opposite ends of the aligned cable passageway to prevent the cable from further movement in and out of the aligned cable passageway.

8. The revetment mat according to claim 7 wherein the one or more stop members comprises a clamp having an outer circumference larger than the circumference of the aligned cable passageways.

9. The revetment mat according to claim 1 further comprising a geogrid affixed to the multiple blocks whereby the geogrid is affixed to a bottom surface of the multiple blocks.

10. The revetment mat according to claim 9 further comprising an erosion-control blanket affixed to the multiple blocks whereby the erosion-control blanket is positioned beneath the geogrid.

11. The revetment mat according to claim 1 further comprising an erosion-control blanket affixed to the multiple blocks whereby the erosion-control blanket is affixed to a bottom surface of the multiple blocks.

12. A revetment mat comprising multiple-sized blocks linked to one another by cables to form non-linear water passageways between the linked blocks; the blocks arranged to form a generally rectangular shaped revetment mat having a receiving side of the revetment mat to receive and direct a water flow into one of the non-linear water passageways and having an opposite discharging side of the revetment mat positioned to discharge the water from the one of the non-linear water passageways; wherein at least one of the blocks is a smaller block and wherein at least another of the blocks is a larger block; and wherein the small block is about one unit wide by about one unit long and the larger block is about one unit wide by about one and one-half units long and wherein the blocks are each separated from each other by about one-eighth to about one-quarter units distance to form water passageways that are about one-eighth to about one-quarter units wide; and wherein; and wherein
   a. the receiving side and the discharging side each comprises a row of small blocks;
   b. a rigid strap attached at one end section to a cable extending from one of the small blocks and attached at an opposite end section to a cable extending from an adjacent small block; the rigid strap having a predetermined length to set the width of a water passageways between the adjacent small blocks; and
   c. for each cable extending through a pair of separated adjacent blocks, the cable also extends through flexible hollow tubular spacer of predetermined length positioned between the separated adjacent blocks to set the distance between the adjacent blocks.

13. A revetment mat comprising multiple-sized blocks linked to one another by cables to form non-linear water passageways between the linked blocks; the blocks arranged to form a generally rectangular shaped revetment mat having a receiving side of the revetment mat to receive and direct a water flow into one of the non-linear water passageways and having an opposite discharging side of the revetment mat positioned to discharge the water from the one of the non-linear water passageways wherein at least one of the blocks is a smaller block and wherein at least another of the blocks is a larger block; each of the smaller block is fabricated having two parallel cable passageways sized to permit the cables to pass through the small block cable passageways, each of the larger block is fabricated having three parallel cable passageways sized to permit the cables to pass through the large block cable passageways, and the two small block cable passageways are either aligned with two of the three large block cable passageways when the small blocks and large blocks are positioned to fabricate the revetment mat, or aligned with one of the three large block cable passageways and with one of the two small block cable passageways when the small blocks and large blocks are positioned to fabricate the revetment mat; and further comprising:
   a. the receiving side and the discharge side of the revetment mat each comprise one row of the small blocks; and
   b. at least one of the rows of blocks in the revetment mat positioned between the receiving side and the discharge side comprises at least two large blocks, each large block positioned at one of the opposite ends of the at least one of the rows of blocks.

14. The revetment mat of claim 13 wherein
   a. for each pair of adjacent cables extending from the cable passageways of adjacent small blocks in the row of small blocks forming the receiving side and the discharge side of the revetment mat, a rigid strap of predetermined length is attached to adjacent cables to fix the distance between the adjacent small blocks; and b. each section of a cable between adjacent blocks extends through a hollow flexible tubular spacer of predetermined length to fix the length of the revetment mat and to permit the revetment mat to be roll up on itself.

15. A revetment mat comprising multiple-sized blocks linked to one another by cables to form non-linear water passageways between the linked blocks; the blocks arranged to form a generally rectangular shaped revetment mat having a receiving side of the revetment mat to receive and direct a water flow into one of the non-linear water passageways and having an opposite discharging side of the revetment mat positioned to discharge the water from the one of the non-linear water passageways; wherein each block comprises a bottom surface, side wall surfaces, and a top surface; the top surface having at least a sloped perimeter area provided with water retarding members.

16. The revetment mat of claim 15 wherein the sloped perimeter area is sloped up and inward from an upper edge of the side surfaces to a flat central area of the top surface.

17. A revetment mat comprising:
    a. multiple blocks positioned with respect to one another to form multiple rows of blocks, each block in a row linked to one another by a cable extending through cable passageways in each of the blocks, the blocks being separated from one another in a position creating non-linear water passageways between the blocks;
    b. the rows of blocks being linked to one another by a series of cables extending through cable passageways in the blocks, the cable passageways in one of the rows of blocks being aligned the cable passageways in an adjacent row of blocks to form a generally rectangular shaped revetment mat;
    c. a first row of small blocks forming a side of the revetment mat to receive and direct a water flow into one of the non-linear water passageways, a last row of small blocks forming an opposite side of the revetment mat to discharge the water from the one of the non-linear water passageways, and at least one interior rows formed by a combination of small blocks and large blocks positioned between the first and last rows;
    d. for each pair of adjacent cables extending from the cable passageways of adjacent blocks in the rows of blocks forming the receiving side and the discharge side of the revetment mat, a rigid strap of predetermined length is attached to adjacent cables at the ends of the cables extending from the end blocks forming the rows of blocks to fix the distance between the adjacent blocks; and
    e. each section of a cable extending through a row of blocks extends through a hollow flexible tubular spacer of predetermined length positioned between a pair of adjacent blocks to fix the length of the revetment mat and to permit the revetment mat to be roll up on itself.

18. The revetment mat of claim 17 comprising:
    a. an even number of aligned cable passageways in the revetment mat,
    b. a first cable extending through the first two rows of aligned cable passageways, and
    c. for each additional pair of rows of aligned cable passageways, an additional cable extend through one of the additional pairs of aligned cable passageways.

19. The revetment mat of claim 18 wherein
    a. each of the cables comprises a length sufficient to pass through two rows of aligned cable passageways and form lifting loops at each end of the aligned cable passageways, and
    b. the ends of each cable are affixed to one another to form a continuous length of the cable.

20. The revetment mat according to claim 19 wherein one or more stop members is affixed to the cable at opposite ends of the aligned cable passageway to prevent the cable from further movement in and out of the aligned cable passageway and to further set the length of the revetment mat.

21. The revetment mat according to claim 17 further comprising a geogrid affixed to the multiple blocks whereby the geogrid is affixed to a bottom surface of the multiple blocks.

22. The revetment mat according to claim 21 further comprising an erosion-control blanket affixed to the multiple blocks whereby the erosion-control blanket is positioned beneath the geogrid.

23. The revetment mat according to claim 17 further comprising an erosion-control blanket affixed to the multiple blocks whereby the erosion-control is affixed to a bottom surface of the multiple blocks.

* * * * *